Patented Mar. 14, 1944

2,344,387

UNITED STATES PATENT OFFICE 2,344,387

METHOD OF PRODUCING SOREL CEMENTS

Josef Berlek, Radenthein, Germany; vested in the Alien Property Custodian

No Drawing. Application June 20, 1939, Serial No. 280,215. In Germany July 21, 1938

1 Claim. (Cl. 106—105)

The caustic burned magnesia which is used particularly for the manufacture of Sorel cement and its varieties, is produced chiefly from amorphous (dense) magnesites, whereas the crystalline magnesites are generally only usable in the production of dead-burned magnesite; an exception are the occurrences in Oberdorf (Steiermark) and in the Zillertal (Tirol) where a crystalline magnesite relatively poor in iron occurs which can also be used in the manufacture of caustic burned magnesia. The problem of enabling the existing large deposits of crystalline magnesite rich in iron to be used in the preparation of caustic burned magnesia, has all along been the task of the magnesite experts. According to a proposal made some time ago, the production of caustic burned magnesia from such magnesites is rendered possible by carrying out the calcination of the magnesite slightly above the lowest temperature required for driving out the carbon dioxide, while introducing steam into the calcining zone, so as to prevent the outer parts already causticized of the material under treatment from being superheated, and as a consequence dead burned during the expulsion of the carbon dioxide from the interior of the lumps. This process has proved to be practical in the calcination of magnesite in rotary furnaces, but even in furnaces of this kind it is not possible to obtain a product which is able to compete successfully with the caustic burned magnesia obtained from amorphous (especially Grecian) magnesia, because in keeping to the low temperatures which are necessary to attain the quality properties of the product resulting from amorphous magnestites, the throughput of the furnace drops to such an extent that the production becomes uneconomical.

In connection with the working up of crystalline magnesites occurring in large deposits, which are rich in iron in comparison with the amorphous magnesites, the present invention has for its object to conduct the calcining operation in such a manner that thereby is ensured the economical production of caustic burned magnesia which is in no way inferior to the commercial products obtained from amorphous magnesites. This is attained according to the invention substantially by completely preventing the conversion of the ferrous oxide contained in the prime material into ferric oxide during the burning operation.

If the calcining of the magnesite is carried out with admission of air the ferrous oxide oxidizes to ferric oxide according to the equation $2FeO + O = Fe_2O_3$. The process according to the invention is based on the new recognition that even the crystalline magnesites rich in iron are absolutely suitable for the production of caustic burned magnesia provided that such oxidation of the ferrous oxide into ferric oxide is virtually prevented. This explains why the crystalline magnesites with increasing iron content become more and more unsuitable for the production of caustic burned magnesia by calcination in the presence of air. It may be left undecided on what internal proceedings the result brought about by the present process depends. In all probability, the ferric oxide in nascent state catalytically promotes the conversion of the magnesia into a more and more dense condition, until at last the setting properties of the magnesia are altogether lost. However this may be, it has been ascertained that crystalline magnesites containing more than 2% of ferric oxide (reckoned on the residue on ignition) or even considerably more than that, when burned with practically complete exclusion of oxygen or with introduction of an inert gas such as $CO_2$, or of a reducing gas such as CO or $H_2$, behave exactly like amorphous magnesites, whereas the same crystalline magnesites under the influence of minute quantities of air yield products which, when calcined under gentle conditions, contain a considerable amount of undecomposed magnesium carbonate or, when more perfectly burned, contain large quantities of dead-burned portions or have even entirely lost their hardening properties.

The caustic burned magnesia has to meet different kinds of requirements according to whether it is to be used for the production of light-weight wood wool bricks or for the production of xylolite floors or the like made from mixtures of sawdust and Sorel cement. In the first instance the magnesia has to set quickly, whereas in the second case a longer setting time, about 4 to 6 hours, with good after-hardening is needed. When starting with crystalline magnesites the present process enables a just as flexible adaptation to the different requirements to be achieved as can be fulfilled when starting with amorphous magnesites.

The testing of the caustic burned magnesia which is intended for the manufacture of light-weight wood wool bricks, is carried out just as in the case of cement testing, by ascertaining the tensile strength. For this purpose, for example three parts by weight of magnesia are mixed with one part by weight of sawdust made into a stiff paste with magnesium sulphate solution of 20° Bé., and pressed by hand into the known tensile strength molds, whereupon these molds are covered at both ends by glass plates and placed two by two in an iron pot with steam-proof closure. This pot is maintained at a temperature of 200° C. for 20 minutes in a drying oven, whereupon the body to be tested is removed from the mold and immediately subjected to the tensile test. Whereas the ordinary Radenthein caustic burned magnesite with an iron content of 3 to 4% (as $Fe_2O_3$ calculated on the residue on ignition) shows after this period a tensile strength of 6 to 7 kg./cm.$^2$, this strength rises to twice as much, that is to 13 to 15 kg./cm.$^2$, when the present process is used. Thus, it has been made possible to make lean the caustic burned magnesia with cheap inert filling substances and in spite of the most sparing use of the binding medium to obtain even an improvement of the light-weight bricks.

In testing the caustic burned magnesia to ascertain its suitability for the purpose of making xylolite floors, the mixture of three parts by weight of magnesia and one part by weight of sawdust, tempered in this instance with magnesium chloride solution of 20° Bé., after having been pressed into the molds in the manner above described, is allowed to harden within the molds for 18 hours at room temperature, whereupon the specimens are removed from the molds and stored in the open air. The following table shows the results of the tensile strength tests after 1, 3, 7 and 28 days for test bodies of three different kinds of caustic burned magnesia, of which I was produced from Euboea magnesite, II from Radenthein magnesite in a rotary furnace with introduction of air, and III from the same Radenthein magnesite with the aid of the present process.

|  | Days | | | |
| --- | --- | --- | --- | --- |
|  | 1 | 3 | 7 | 28 |
|  | Kg./cm.$^2$ | Kg./cm.$^2$ | Kg./cm.$^2$ | Kg./cm.$^2$ |
| I | 30 | 47 | 55 | 65 |
| II | 15 | 25 | 40 | 50 |
| III | 38 | 50 | 60 | 65 |

Both the product from the amorphous magnesite poor in iron and also the product resulting from the burning of Radenthein magnesite according to the invention, showed a rapid rise in strength, which is extremely desirable for xylolite floor production; on the other hand, the product obtained by the ordinary rotary furnace calcining hardened but slowly owing to containing a large percentage of dead-burned portions.

The following comparative figures illustrate the setting time:

|  | Beginning | End |
| --- | --- | --- |
|  | Hours | Hours |
| I | 2 to 3 | 4 to 7 |
| II | 1 | 3 |
| III | 2 to 3 | 5 to 7 |

Also in this respect the product of the present process is quite equivalent to that from Grecian magnesite. The late beginning of setting—in addition to the long setting time—is very desirable for the production of xylolite floors or the like, because it is thus possible to deal at once with a large bulk of the mixture without any danger of the moist mass partly setting already in the mixing through, which event, as experience has shown, would result in an noticeable deterioration of the flooring laid.

Also as regards storage property in ground state, the product obtained from the crystalline Radenthein magnesite when treated according to the present process, is quite as good as the best products from amorphous magnesites, whereas the caustic burned magnesia produced by the ordinary rotary furnace calcining under otherwise identical conditions on being stored adsorbs 4 to 5 times as much moisture as the caustic burned magnesia obtained from Grecian prime material.

Seeing that even small traces of air penetrating into the furnace are endangering the result aimed at, it is primarily the shaft furnace which is suitable for carrying out the process, since this furnace is capable of being perfectly tightened.

This process is also valuable for working up crystalline magnesites poor in iron which would produce good results even when calcined under air admission, for in this case the process enables the quality properties of the resulting products to be still further improved.

What I claim is:

The method of producing a Sorel cement in which the basic magnesia constituent is made from naturally occurring crystalline magnesite having such a high ferrous iron content that Sorel cement containing the magnesia if produced from said magnesite by burning under oxidizing conditions, would be injured by the oxidation of said iron to the ferric state, which method comprises calcining such magnesite having such a high ferrous iron content at a temperature sufficiently high to produce caustic burned magnesia and continuously during such calcining operation introducing a stream of reducing gas to maintain the material in a reducing atmosphere and produce caustic burned magnesia in which substantially all of the iron due to reducing atmosphere, is present in the ferrous state, and mixing the so calcined caustic burned magnesia with a soluble magnesium salt to give a high quality of Sorel cement.

JOSEF BERLEK.